(12) United States Patent
Bahl

(10) Patent No.: US 7,146,418 B2
(45) Date of Patent: Dec. 5, 2006

(54) METHOD AND SYSTEM FOR PROVIDING TRANSPARENT MOBILITY SUPPORT

(75) Inventor: Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 09/992,451

(22) Filed: Nov. 16, 2001

(65) Prior Publication Data

US 2003/0097484 A1 May 22, 2003

(51) Int. Cl.
*H04L 7/38* (2006.01)
*H04L 12/28* (2006.01)

(52) U.S. Cl. .............. 709/224; 709/228; 370/331; 370/338; 455/56.1

(58) Field of Classification Search ............... 709/222, 709/224, 227, 219, 228; 726/6; 370/353, 370/389, 331, 338; 455/435.2, 56.1; 379/59
See application file for complete search history.

(56) References Cited

U.S. PATENT DOCUMENTS

| 6,061,650 | A | 5/2000 | Malkin et al. | |
|---|---|---|---|---|
| 6,104,929 | A | 8/2000 | Josse et al. | |
| 6,195,705 | B1 | 2/2001 | Leung | |
| 6,230,012 | B1 | 5/2001 | Willkie et al. | |
| 6,360,269 | B1 | 3/2002 | Mamros et al. | |
| 6,456,621 | B1 * | 9/2002 | Wada et al. ........... | 370/389 |
| 6,505,047 | B1 | 1/2003 | Palkisto | |
| 6,526,033 | B1 | 2/2003 | Wang et al. | |
| 6,535,493 | B1 | 3/2003 | Lee et al. | |
| 6,574,214 | B1 | 6/2003 | Khalil et al. | |
| 6,594,692 | B1 * | 7/2003 | Reisman ................ | 709/219 |
| 6,608,832 | B1 * | 8/2003 | Forslow ................ | 370/353 |
| 6,651,105 | B1 | 11/2003 | Bhagwat et al. | |
| 6,697,354 | B1 | 2/2004 | Borella et al. | |
| 6,728,536 | B1 | 4/2004 | Basilier et al. | |
| 6,820,204 | B1 * | 11/2004 | Desai et al. .......... | 726/6 |

OTHER PUBLICATIONS

Bellovin et al., "On the Use of SCTP with IPsec," *Network Working Group—Internet Draft*, pp. 1-6 (2000) printed at http://bgp.potaroo.net/ietf/all-ids/draft-ietf-ipsec-sctp-00.txt.

(Continued)

*Primary Examiner*—Khanh Quang Dinh
(74) *Attorney, Agent, or Firm*—Wolf, Greenfield & Sacks, P.C.

(57) ABSTRACT

A system and method for providing transparent mobility support employs a mobile service in an API layer of an operating system to leverage the capability of a session establishment service that implements the Session Initiation Protocol or the like for locating a remote node for session setup and detecting address change of the remote node. When an application on a correspondent host (CH) wants to communicate with a second application on a mobile host (MH), the mobility service of the CH uses the session establishment service to locate the mobile host and set up a session with it, and then sets up a transport data channel for the session. When the MH changes its network address, the session establishment service of the CH finds out the new address through the operation of the session establishment protocol and reestablishes the session with the MH. The new address of the MH is then communicated to the CH's mobility service, which resets the data channel to connect to the new address, thereby allowing communication data from the first application to continue to flow to the MH.

17 Claims, 4 Drawing Sheets

OTHER PUBLICATIONS

Johnson et al., "Mobility Support in IPv6," *IETF Mobile IP Working Group—Internet Draft*, pp. 1-149 (Mar. 2002) printed at http://k-lug.org/~grisworld/Drafts-RFCs/draft-ietf-mobileip-ipv6-16.txt.

Kelly, Scott, "Content Requirements for ISAKMP Notify Messages," *IPSEC Working Group—Internet Draft*, pp. 1-27 (Nov. 2000) printed at http://www.ietf.org/proceedings/01mar/I-D/ipsec-notifymsg-04.txt.

Piper, D., "The Internet IP Security Domain of Interpretation for ISAKMP," *Network Working Group*, Request for Comments 2407, pp. 1-32 (Nov. 1998) printed at http://www.faqs.org/ftp/rfc/pdf/rfc2407.txt.pdf.

Maughan, D., Internet Security Association and Key Management Protocol (ISAKMP), *Network Working Group*, Request for Comments 2408, pp. 1-71 (Nov. 1998) printed at http://ietfreport.isoc.org/rfc/rfc2408.txt.

Orman, H., "The OAKLEY Key Determination Protocol," *Network Working Group*, Request for Comments 2412, pp. 1-46 (Nov. 1998) printed at http://ietfreport.isoc.org/rfc/rfc2412.txt.

Handley, "SIP: Session Initiation Protocol", Network Working Group, RFC 2543, Mar. 1999 (pp. 1-153).

Handley et al., "SDP: Session Description Protocol", Internet Engineering Task Force, Mar. 2, 1999 (pp. 1-31), retrieved from http://ietfreport.isoc.org/old-ids//draft-ietf-mmusic-sdp-new-01.txt.

Vakil et al., "Supporting Service Mobility with SIP", Internet Engineering Task Force, Dec. 2000, (pp. 1-10) <draft-itsumo-sip-mobility-service-00.txt.

* cited by examiner

METHOD AND SYSTEM FOR PROVIDING TRANSPARENT MOBILITY SUPPORT

TECHNICAL FIELD OF THE INVENTION

This invention relates generally to network communications involving mobile devices, and more particularly to the handling of network communications between a user computer and a mobile device when the network address of the mobile device changes.

BACKGROUND OF THE INVENTION

With the rapid developments in wireless networking, mobile devices, such as laptop computers, personal digital assistant (PDA) devices, high-end cellular phones, etc., are playing an increasingly important role in network communications. Mobile devices typically communicate with other devices by transmitting and receiving data over radio frequency (RF) channels. The wireless nature of the RF communications allows the devices to be mobile, i.e., to move from one place to another without losing network connectivity.

Although the mobility of mobile devices provides great freedom and convenience to their users, there are technical challenges in supporting device mobility. One major issue is how to maintain communication continuity when a mobile device moves around. When a mobile device crosses a boundary between subnets, it may be assigned a new network address. When the mobile device changes its address, all the computers it has network connections with (called "correspondent hosts") lose communication with it. The term "network connection" is used in a generic way to refer to a data stream. This data stream may be connection oriented or connectionless. They have to rediscover the address of the mobile host and to restart their communications with it. Thus, the address change of the mobile host can be disruptive to the operation of many applications.

Conventionally, in order to deal with such disruption, an application has to include code to handle the mobility of the mobile devices. Alternatively, to keep mobility transparent to the applications, schemes such as Mobile IP (for TCP/IP networks) are employed that require mapping between a permanent address of the mobile host (also called the home address of the mobile host) and its current address (also called care of address of the mobile host) and the use of encapsulation or extension headers for continued communication between the mobile host and the nodes it had active sessions with. Code for mobility aware applications can be complex with high operational overhead, and having to develop the code to support mobility handling is burdensome to developers of the software applications. On the other hand, a scheme such as Mobile IP results in a packet overhead for the life of the session after the address has changed. It also requires that a mapping of the home address to the current address of the mobile host be permanently maintained.

Accordingly, there is currently a need for a mobility support scheme that does not require applications to include extensive code for mobility support or to be concerned with the details of the mobility support operation and to avoid the permanent packet and context overhead borne by schemes that keep mobility transparent to the applications.

SUMMARY OF THE INVENTION

In view of the foregoing, the present invention provides a system and method for a user computer that has a first application communicating with a second application on a mobile host (MH) to handle, in a way that is transparent to the applications, an address change of the mobile host (MH) to avoid disrupting the communications between the two applications. Each of the user computer and the mobile host has a mobility service module for handling the mobility support operation. The mobility service is implemented in an Application Programming Interface (API) layer of the operating system such that an application can easily use it for handling network communication operations as they would with a conventional API component over TCP/IP calls. The mobility service interacts with a session establishment service that implements a protocol for session establishment and handling such as the Session Initiation Protocol (SIP), that is capable of locating a remote party to set up a session and tracking address changes of the remote party. The protocol for session establishment and handling are referred to hereinafter for the sake of brevity as the "session establishment protocol."

When the first application on the user computer wants to communicate with the second application on the mobile host, it calls the mobility service of the user computer to set up the communication channel. The mobility service of the user computer uses the session establishment service to locate the mobile host and to set up a session with it. Once a session is set up, the mobility service of the user computer sets up a transport data channel of a type specified by the application for the session. Communications between the two applications are then sent over the transport data channel.

When the mobile host changes its network address, the session establishment service of the user computer automatically finds out the new address through the operation of the session establishment protocol and reestablishes the session with the mobile host using the new address. The new address of the mobile host is also communicated to the mobility service of the user computer. The mobility service resets the transport data channel to connect to the new address, thereby allowing communication data from the first application to continue to flow to the mobile host. Any data buffered during the mobility transition phase is resent on the new data channel to the mobile host.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
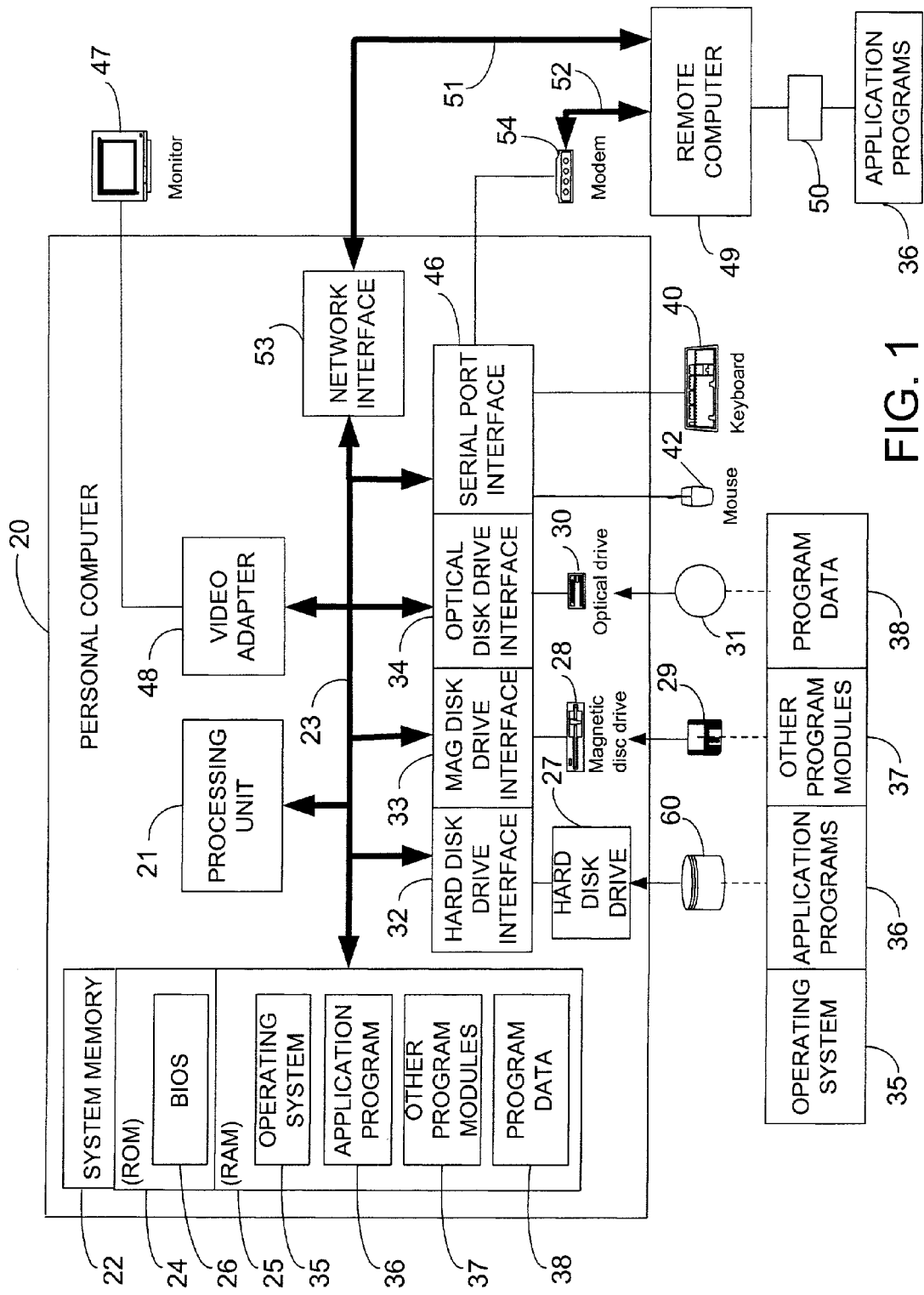
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2–5. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
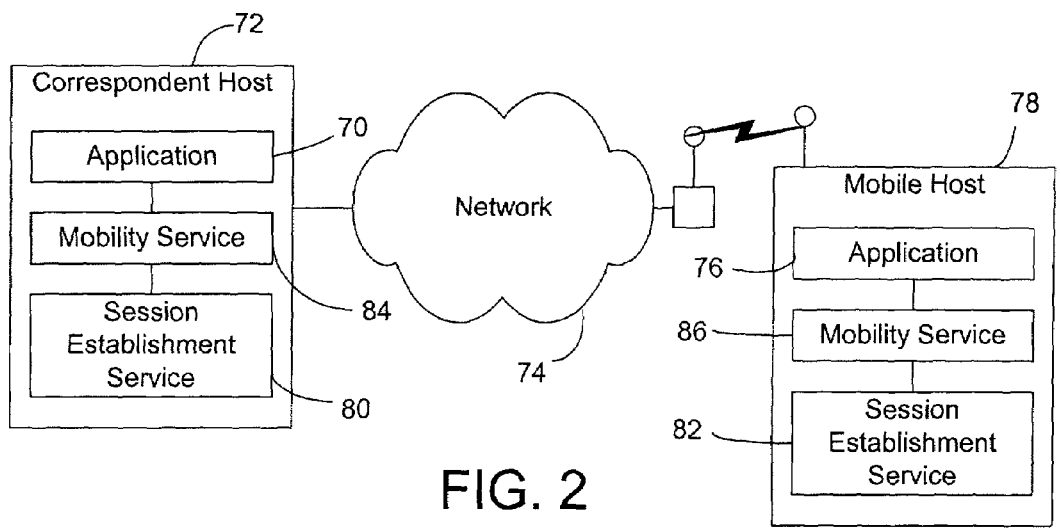
FIG. 2 is a schematic diagram showing a correspondent host communicating with a mobile host that has a mobile service and a session establishment service for mobility support in accordance with the invention.

Referring now to FIG. 2, the present invention is directed to a scheme for providing transparent user/application mobility support for communications involving a mobile device. As shown in FIG. 2, a user application 70 on a first computer 72 communicates over a network 74, such as the Internet, with another application 76 running on a second computer 78. In accordance with an aspect of the invention, the second computer 78 is a mobile device, whose network address may change from time to time as its location changes. The second computer 78 is hereinafter referred to as the mobile host (MH), while the first computer 72 is referred to as the correspondent host (CH).

During the course of communication between the user application 70 on the correspondent host and the application 76 on the mobile host, the mobile host 78 may move to a different subnet and, as a result, obtain a new network address. Conventionally, if the operating systems of the two computers do not support transparent mobility, when the mobile host 78 changes its address, all of its correspondent hosts lose their communication connections with it. They have to somehow discover the new address of the mobile host and restart their communication sessions. This operation is disruptive to many applications.

The present invention solves this problem by providing a scheme for transparent mobility support that automatically locates the new address of the mobile host and reestablishes the data channel between the two computers based on the new address, without requiring the attention of the applications conducting the communications. This scheme leverages the implementation of a session establishment protocol, such as the Session Initiation Protocol (SIP), that supports automatic finding of the address of a session participant, setting up sessions, and tracking address changes of the session participant. As shown in FIG. 2, each of the mobile host and correspondent host has a session establishment service 80 or 82 that implements the session establishment protocol. Each host is further provided with a mobility service component 84 or 86 for interacting with the session establishment service to achieve transparent mobility support.

In accordance with a feature of the invention, the mobility service 84 or 86 is implemented in the Application Programming Interface (API) layer of the operating system of the computers. By putting the mobility service in the API layer, an application can easily use the mobility service to handle network communication operations by simply calling functions exposed by the mobility service, similar to the way an API component over a TCP/IP driver is conventionally used by applications for network communications. The mobility service uses the infrastructure of the network implementing the session establishment protocol for handling client mobility. It forms a "mobility-aware" layer between the client (i.e., the application) and the data transport. As described in greater detail below, this "mobility-aware" layer handles data channel maintenance during mobility transition of the mobile device. The session establishment service, on the other hand, handles the setting and resetting of a session as one or both parties of the session move and change their addresses.

In accordance with another feature of the mobility support scheme of the invention, each node or application involved in the communications is identified by a unique name rather than by its routable network address. Thus, for example, the application 70 on the correspondent host 72 intending to talk to the application 76 on the mobile host 78 identifies the application or the mobile host by a name instead of the current network address of the mobile host. In other words, the application 70 (which is the client of the mobility service 84) binds to a name and communicates with a name. It stays oblivious of mobility-caused address changes, which are handled by the mobility service 84 leveraging the session establishment service 80.

It will be appreciated that the name used by the application 70 on the correspondent host to refer to a remote communication party may identify the remote application or the node (i.e., the mobile host) on which the remote application runs. It is not a critical point whether the name is that of the remote application or the mobile host, as long as the name can be used through the aid of network directory services to obtain the network address of the node to enable delivery of communication data to the intended remote application. Since in a general sense the mobile host and the applications or services running thereon are both "mobile," the term "mobile entity" is uses herein to mean either a mobile node or an application or service on the mobile node. The name used to identify a mobile entity may be, for example, something similar to an e-mail moniker (e.g., Fred@abcd.com) or a fully qualified domain name (FQDN). Of course, other types of names may be used. An important advantage of identifying a mobile entityby a name is that a name provides a higher level of abstraction than an address and can stay constant while the mobile host or the remote application changes its address due to mobility. A network address of a mobile entity does not really identify the mobile entity. Rather, it only identifies the mobile entity's current physical point of attachment. For network communications involving mobile entities, the address by which a mobile entity is reachable can change any time, and it is not easy for an end application communicating with that mobile entity to constantly adapt itself to the address changes. By allowing an application to identify the remote party by a name, the mobility service is able to hide all name-to-address mapping from the application, thereby relieving the application of the burden of handling mobility Still referring to FIG. 2, when the application 70 on the correspondent host 72 wants to communicate with the application 76 on the mobile host 78, it calls the mobility service 84 to set up a connection with the mobile host, which is identified by its unique name. The mobility service 84 translates the name to an address using the Domain Name Service (DNS) or some other name service that machine is configured to use. It then uses the session establishment service 80 to locate the mobile host 78 and to set up a session with the mobile host. Once the session is set up, the mobility service 84 sets up a data channel for the session using the transport protocol specified by the user, such as the TCP or UDP. Communications between the application 84 on the correspondent host and the application 76 on the mobile host are then conducted over that data channel.

When the mobile host 78 changes its address, the session establishment service 80 of the correspondent host 72 automatically finds out the new address of the mobile host through the infrastructure and operation of the session establishment protocol. Upon learning of the address change, the session establishment service 80 reestablishes the session with the mobile host. Once the session is reestablished, the new address of the mobile host is communicated to the mobility service 84 of the correspondent host. The mobility service 84 then resets the data channel to connect the correspondent host to the new address. Any data buffered during the mobility transition phase (i.e., the period between the mobile host's changing its address and the correspondent host's resetting the data channel for the new address) is then resent over the reset data channel to the application 76 on the mobile host 78. Since the application 70 identifies the intended recipient of its communication data by the name of the remote application rather than by the address of the mobile host, it is not affected by the address change and does not have to do anything in response to the address change. The application 76 on the mobile host also does not have to be aware of or do anything to handle the address change. Thus, the mobility support is carried out transparently to the applications 70 and 76.

Figure 3:
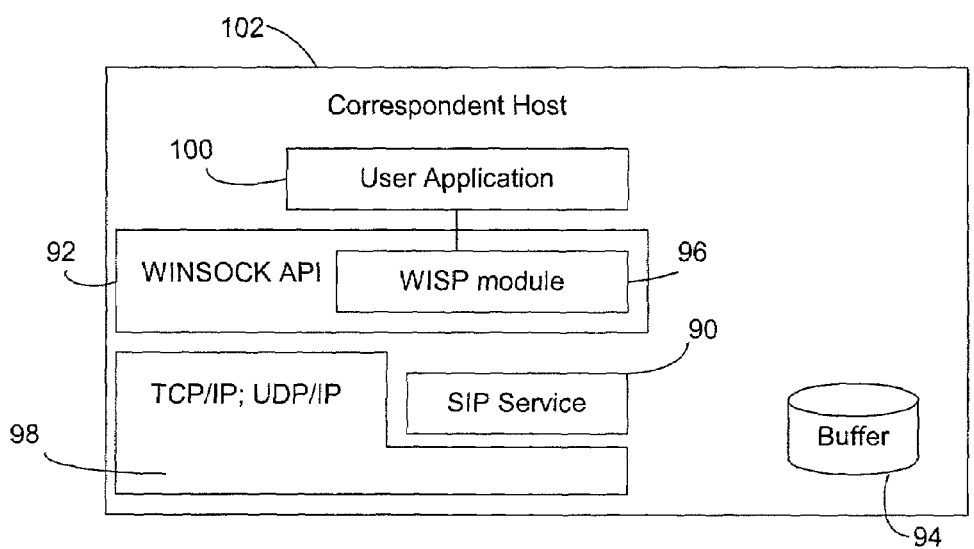
FIG. 3 is a schematic diagram of an embodiment of the correspondent host wherein the mobility service is in a WINSOCK API layer and the session establishment service utilizes the Session Initiation Protocol (SIP)

In a preferred embodiment as illustrated in FIG. 3, the session establishment service implements the Session Initiation Protocol (SIP), which is defined in Request for Comments (RFC) 2543 of the Internet Engineering Task Force (IETF), and is hereinafter referred to as the SIP service 90. Moreover, the mobility service component is implemented in the Winsock interface 92 of the Windows operating system of the Microsoft Corporation and is hereinafter referred to as the "Winsock over SIP" (WISP) module 96. The Winsock interface 92 is part of the API layer of the operating system disposed between applications and the TCP/IP or UDP/IP stack 98 for handling data communications via the TCP/IP or UDP/IP.

Figure 4:
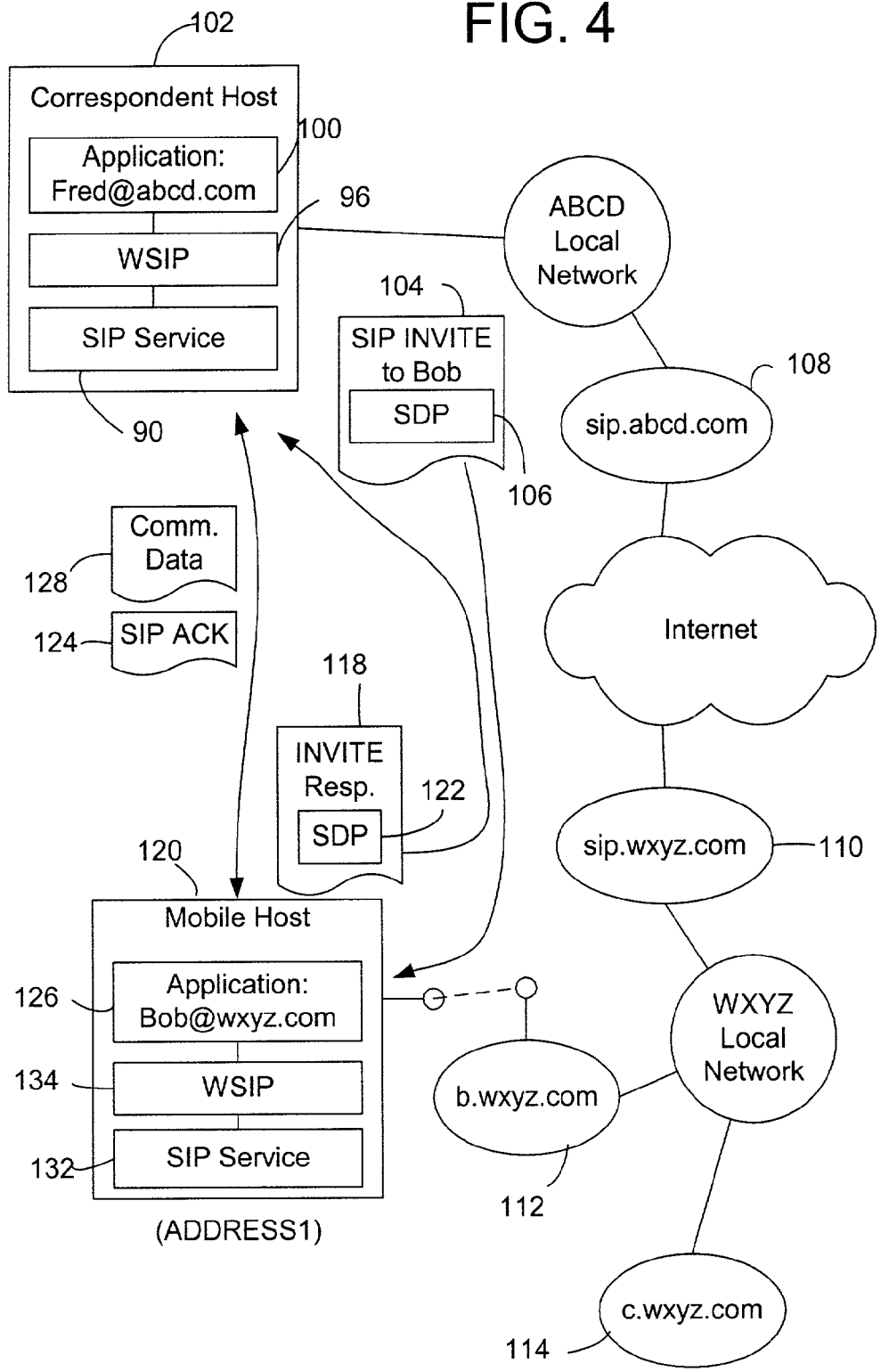
FIG. 4 is a schematic diagram illustrating data flows in a process of the correspondent host of the embodiment of FIG. 3 setting up a communication connection with the mobile host.
Figure 5:
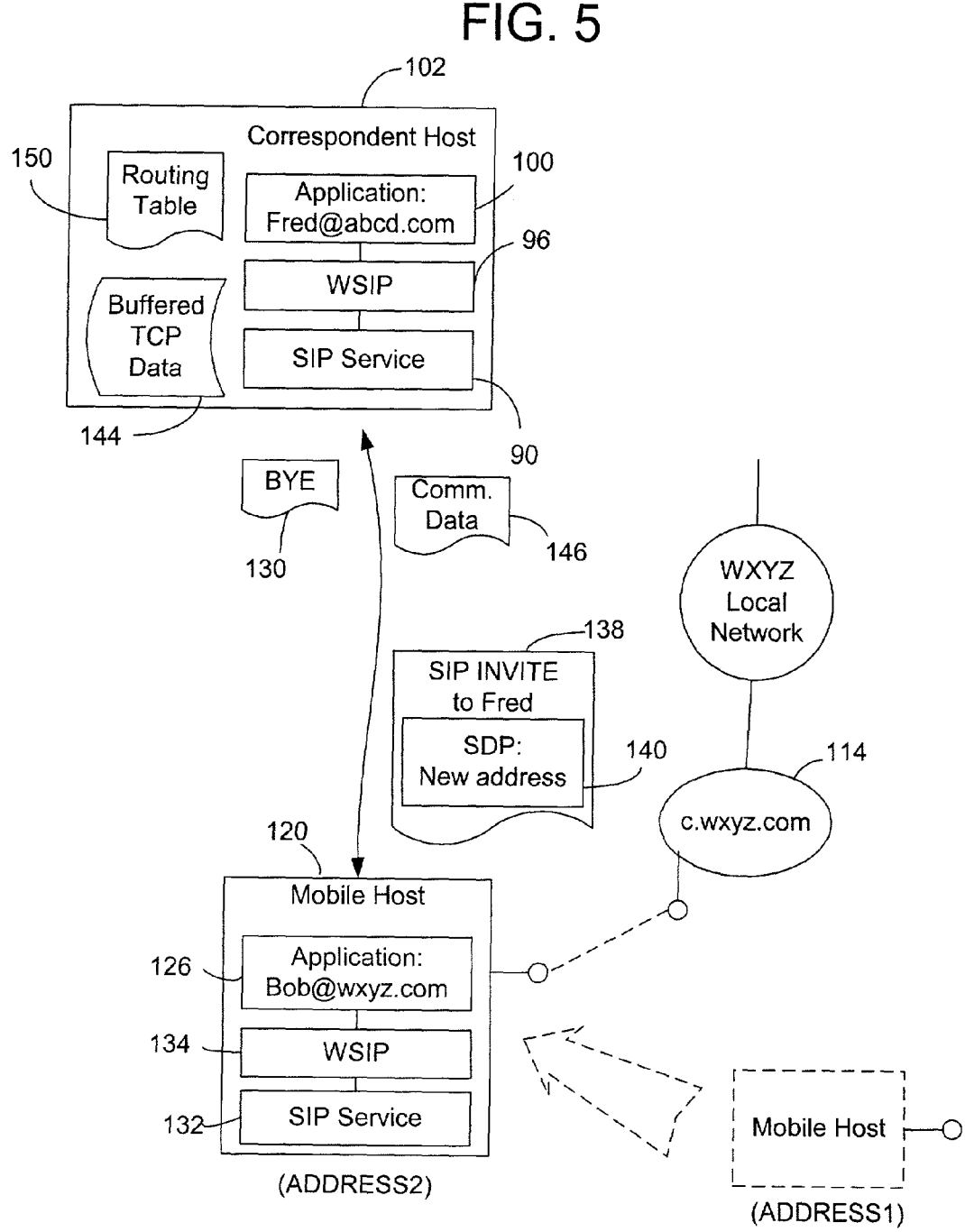
FIG. 5 is a schematic diagram illustrating data flows in a process of the correspondent host of the embodiment of FIG. 3 handling an address change of the mobile host.

By way of example, FIGS. 4 and 5 are provided for illustrating how the WISP module 96 in the embodiment of FIG. 3 with the help of the SIP service 90 locates a remote party and sets up a data channel for communications with it, and how the WSIP module handles the address change of the remote party to provide mobility support that is transparent to the application using the data channel. In this example, the application 100 on the correspondent host 102 identifies itself by the name of Fred@abcd.com (hereinafter referred to as "Fred" for simplification) and identifies the remote application 126 it wants to communicate with as Bob@wxyz.com (hereinafter referred to as "Bob" for simplification).

Referring to FIG. 4, the application 100 (i.e., Fred) on the correspondent host 102 asks that a TCP connection be set up with Bob. In response to the application's request, the WSIP module 96 calls the SIP service 90 with appropriate parameters to set up a SIP session. The parameters passed by the WSIP 96 to the SIP service 90 indicates that the SIP session is to be set up for supporting a TCP connection with Bob. In response, the SIP service 90 of the correspondent host 102 sends out a SIP INVITE request message 104 intended for Bob. This request message 104 carries Fred's IP address and the port to be used for the TCP connection. The TCP connection information is sent in the Session Description Protocol (SDP) description 106 carried in the SIP INVITE request message 104. The request message 104 goes to a local server 108 at company ABCD (e.g., sip@abcd.com). The local server 108 recognizes that the request 104 is not meant for it and forwards it to the local server 110 for the company WXYZ (e.g., sip.wxyz.com). A Domain Name System (DNS) SRV record is used to look up this server 110 in this forwarding operation.

The server 110 (sip.wxyz.com) of the WXYZ local network has the current address of mobile host on which Bob runs at any time in its database. When it receives the SIP INVITE message, the server 110 directs the message to the current address (shown as "ADDRESS1" in FIG. 4) of the mobile host. As illustrated in FIG. 4, the mobile host 120 is currently linked to a subnet 112 at b.wxyz.com.

In response to the SIP INVITE message request, the mobile host returns a response message 118 to the correspondent host. The response message 118 contains the network address of the mobile host and specifies the port to be used for data communication with Fred. This information is in the SDP description 122 in the response 118 to the SIP INVITE request. The correspondent host 102 then exchanges SIP acknowledgment (ACK) 124 with the mobile host 120. The SIP session is now set up. The WSIP module 96 of the correspondent host gets the SDP information from the SIP service 90 and extracts the current IP address and port information about Bob. It then uses the TCP/IP driver 98 (FIG. 3) to set up a TCP connection to the current network address of the mobile host and sends the application data 128 over this TCP connection.

The way the WSIP 96 handles mid-call mobility (i.e., the case where the remote party, in this case Bob, moves while there is an ongoing SIP session and TCP channel with it) is now described with reference to FIG. 5. Continuing the above example, Fred@abcd.com (Fred) and Bob@wxyz.com (Bob) have a SIP session already set up, and Bob@wxyz.com is mobile. As Bob's node (i.e., the mobile host 120) moves its location from one subnet (b.wxyz.com) to another subnet 114 (c.wxyz.com), it receives a new network address (shown in FIG. 4 as "ADDRESS2"). For simplicity and clarity of illustration, some of the network components between the correspondent and mobile hosts are not shown in FIG. 5. In response to the address change, the SIP service 132 of the mobile host sends a SIP INVITE request 138 to Fred's node (i.e., the correspondent host 102) without going through any intermediate SIP proxy server. The SIP INVITE request 138 contains an updated SDP description 140 with the new IP address of the mobile host. This SIP INVITE request is a one-way message. As a result of receiving this request, the SIP service 90 on the correspondent host 102 notes the new address and uses it to reset the SIP session. The SIP service 90 then informs the mobility service 96 about the address change of the mobile host.

The mobility service 90 of the correspondent host extracts the new IP address of the mobile host from the SDP description, and makes an I/O control (IOCTL) call into the TCP driver 98 (FIG. 3) to get the buffered data on the connection based on the old address of the mobile host from the buffer 94. This prevents the buffered data from being lost when the TCP connection is terminated. The mobility service 96 sets up a new TCP connection using the new address of the mobile host 120. Any new application data received from the application between the termination of the old connection and the setup of the new connection is buffered by the mobility service behind the data unbuffered by it from the old connection for the purpose of sending it on the new connection. It should be noted that the setting up of the new TCP connection may be performed by the mobility service of Bob. The unbuffering of the data from the old connection end point and buffering of any data received from the local application during the switchover behind the unbuffered data is still done as part of moving over to the new connection at the correspondent host. Once the new connection is set up, the old TCP connection is terminated. The setting up of the new connection and the termination of the old is referred to as resetting of the TCP connection.

After resetting the TCP connection, the mobility service 96 sends the buffered data 144 over the new TCP connection. All new communication data 146 generated by the application 100 now flows over this new TCP connection. In this way, the transition to a connection for the new mobile host address is completed, and this transition is transparent to the application 100 and the application 126.

It should be noted that in the process described above those TCP data buffered at the correspondent host and waiting for acknowledgment from the mobile host will not reach the mobile host over the old connection due to its changed address and is therefore resent when the new connection is set up using the new address. The transition time, i.e., the time elapsed between the mobile host's changing its address and the setting up of the new connection, may represent a delay that is considered too long for some real-time clock (RTC) applications, such as voice-over-IP (VoIP) telephony applications. To avoid this delay, an alternative embodiment uses IP layer tunneling of data packets to ensure session continuity during the transition period. Specifically, in this embodiment, a node monitors its TCP connections. When the mobile host changes its IP address, the WSIP 134 of the mobile host 120 notifies all of its TCP peers (i.e., correspondent hosts participating in sessions with the mobile host) about the new address using the SIP INVITE messages. It keeps the context for the old TCP connection intact so as to continue to accept any packets that are received for it. In response, the correspondent host 102 sets up a tunneling entry in its routing table 150 based on the old and new IP addresses of the mobile host. Due to this tunneling entry in the routing table, packets for the mobile device have the new address in the outer IP header and the old address in the inner IP header. The correspondent host uses tunneling to transmit the packets of an on-going TCP connection to the new IP address while it sets up a new TCP connection, one using the new address. The tunneling entry is removed from the routing table and the old TCP connection is terminated when the new TCP connection is ready. Likewise, the mobile host removes the old TCP connection completely when the new one has been formed.

Although the example above shows the TCP connection setup done by the correspondent node, it could be done by the mobile node also. The node responsible for doing it, whether it is the mobile node or the correspondent node, can be specified in the SDP sent in the SIP INVITE as the proposed initiator of the connection. In case there is a scenario where both nodes initiate the INVITE and specify different initiators for the connection, some criteria such as the "node with the lower IP address wins" for instance can be used to resolve the contention. Also, each node, if it has data buffered on the old connection, would extract it at its end in order to send it on the new connection once it gets set up.

When the application 100 (i.e., Fred) wants to terminate the connection with the other application 126 (i.e., Bob), it makes an API call to the WSIP module 96. In response, the WSIP 96 terminates the TCP connection. It also terminates the SIP session through an API call into the SIP service 90. As a result, the SIP service 90 terminates the session with Bob, through a BYE request 130, and the connection is now gone.

In the embodiment described above in connection with FIGS. 4 and 5, the transport protocol involved is the TCP. It will be appreciated, however, other transport protocols, such as the UDP, may also be used. The difference between TCP and UDP transport protocol handling that in case of UDP, there is no buffered data kept on a UDP socket by UDP, unlike the case with TCP. Therefore data that was sent during the window between the mobile host changing its address and the correspondent host switching to the new address for the data communication is lost. The rest of the operation for the transparent handling of mobility is still the same. An intelligent buffering scheme at the mobility service, at the cost of some complexity, can be used to reduce the loss of such data to a minimum.

Also, although the description above is directed to a "device mobility" scenario where a remote node, namely the mobile host, has moved, the mobility support scheme of the invention can also handle an "application mobility" scenario where the remote application has been moved to a different node. In the "application mobility scenario," because the remote application is identified by a name (e.g., Bob in the example of FIG. 4), an application (e.g., Fred in FIG. 4) that wants to communicate with the remote application does not have to know that the remote application is now at a different location. For example, when Fred wants to talk to Bob, it calls the WSIP module 96, which then uses the SIP service 90 to set up a session with Bob. The SIP INVITE message sent out by the SIP service 90 will be routed to Bob's new location by means of the operation of the infrastructure of the SIP implementation. A session is then set up, and a transport data channel is set up in that session for Fred and Bob to send communication packets to each other.

Also, although the scheme is explained in terms of mobility of just one node, it will work when both nodes move simultaneously. In this case, each will send the INVITE to other. These INVITEs will be directed to the new location of the peer node by the proxy servers thus enabling session reinitiation to succeed.

The following description lists several functions of the mobility service in the embodiment of FIG. 3 to be supported for performing the mobility support operation.

S=Socket (int af, int type, int protocol)// socket (PF_INET, SOCK_STREAM, PF_SIP)

This function opens an endpoint and marks it as one that uses SIP as a control protocol and the specified protocol as the transport for sending/receiving data. The following calls are explained assuming that a SOCK_STREAM(TCP) socket has been opened.

Bind(SOCKET S, struct sockaddr *local_addr, int namelen) where sockaddr contains an IP address or a name This function binds a local name or address and a fixed or dynamically selected port to the socket. It does a SIP registration with a registrar/proxy to register its name.

Connect(SOCKET s, struct sockaddr *remote addr, int namelen)

This function does a SIP INVITE to setup the control connection with the remote user. When the SIP INVITE call is successful, it sets up a TCP connection with the remote user.

Listen(SOCKET s, int backlog)

This function listens for a SIP INVITE and a connection request. It accepts or denies a SIP INVITE based on SIP and SDP parameters.

Accept(SOCKET s, struct sockaddr *client_add, int *client_add_len)

This function accepts the TCP connection corresponding to the accepted SIP call. It opens a new socket for the TCP connection end point and returns it as its return value Send(SOCKET s, char *pcBuff, int LenOfBuff, int flags)

This function sends data on the TCP connection

Recv(SOCKET s, char *pcBuff, int LenOfBuff, int flags)

This function receives data on the TCP connection

Closesocket(SOCKET s)

This function closes the SIP endpoint. This action closes the SIP call and terminates the TCP connection associated therewith.

Shutdown(SOCKET s, int how)

This function shuts down the SIP endpoint for sending, receiving, or both. It does the same to the TCP socket.

The Select and Ioctlsocket calls are not given above but will apply to the SIP-enabled data socket in a manner similar to the above functions.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for a correspondent host to provide mobility support for communications with a mobile host, the steps comprising:
    receiving, by a mobility service of the correspondent host, a request from a first application on the correspondent host to set up a communication connection with a second application on the mobile host, the mobility service being implemented in an application programming interface (API) layer of an operating system of the correspondent host, wherein the mobility service is operative to provide mobility support for the first application in communicating with the second application when the mobile host moves between addresses;
    calling, by the mobility service, a session establishment service of the correspondent host implementing a session establishment protocol to establish a session with the mobile host;
    establishing, by the session establishment service, a session with the mobile host;
    setting up, by the mobility service, a communication connection under a transport protocol for communications between the first and second applications;
    obtaining, by the session establishment service, a notice through operation of the session establishment protocol that the mobile host has moved to a new address;
    reestablishing, by the session establishment service, a session with the mobile host for the new address of the mobile host; and
    resetting, by the mobility service, a communication connection for the new address of the mobile host,
    wherein the computer-executable instructions further comprise computer-executable instructions for the correspondent host to perform the steps of:
    retrieving buffered communication data for the communication connection between the first and second applications prior to resetting the communication connection; and
    sending the retrieved buffered communication data over the reset communication channel for the new address of the mobile host.

2. A computer-read medium as in claim 1, comprising further computer-executable instructions for the correspondent host to perform the step of tunneling communication data to the mobile host using the new address of the mobile host before completing the step of resetting.

3. A computer-readable medium as in claim 1, wherein the session establishment protocol is the Session Initiation Protocol.

4. A computer-readable medium as in claim 1, wherein the transport protocol is the TCP.

5. A computer-readable medium as in claim 4, wherein the transport protocol is the UDP.

6. A computer-readable medium as in claim 1, wherein the first application identifies the second application by a name in the request to form a communication connection.

7. A computer-readable medium having computer-executable instructions for performing steps for a correspondent host to provide mobility support for communications between a first application on the correspondent host with a second application on a mobile host over an existing session and an existing communication connection, the steps comprising:
    receiving, by a session establishment service of the correspondent host implementing a session establishment protocol, a notice through operation of the session establishment protocol that the mobile host has moved to a new address;
    reestablishing, by the session establishment service, a session with the mobile host for the new address of the mobile host; and
    resetting, by a mobility service, a communication connection for the new address of the mobile host for communications between the first and second applications, the mobility service being implemented in an application programming interface (API) layer of an operating system of the correspondent host,
    wherein the mobility service is to provide mobility support for the communications between the first application and the second application when the mobile host moves between addresses, and
    wherein the computer-executable instructions further comprise computer-executable instructions for the correspondent host to perform the steps of:
    retrieving buffered communication data for the communication connection between the first and second applications prior to resetting the communication connection; and
    sending the retrieved buffered communication data over the reset communication channel for the new address of the mobile host.

8. A computer-readable medium as in claim 7, comprising further computer-executable instructions for the correspondent host to performs the steps of tunneling communication data to the mobile host using the new address of the mobile host after receiving the notice of the new address of the mobile host and before completing the step of resetting.

9. A computer-readable medium as in claim 7, wherein the session establishment protocol is the Session Initiation Protocol.

10. A computer-readable medium as in claim 7, wherein the transport protocol is the TCP.

11. A computer-readable medium as in claim 7, wherein the transport protocol is the UDP.

12. A method for a correspondent host to provide mobility support for communications with a mobile host, comprising the steps of:
    receiving, by a mobility service of the correspondent host, a request from a first application on the correspondent host to set up a communication connection with a second application on the mobile host, the mobility service being implemented in an application programming interface (API) layer of an operating system of the correspondent host, wherein the mobility service is operative to provide mobility support for the first application in communicating with the second application when the mobile host moves between addresses;

calling, by the mobility service, a session establishment service of the correspondent host implementing a session establishment protocol to establish a session with the mobile host;

establishing, by the session establishment service, a session with the mobile host;

setting up, by the mobility service, a communication connection under a transport protocol for communications between the first and second applications;

obtaining, by the session establishment service, a notice through operation of the session establishment protocol that the mobile host has moved to a new address;

reestablishing, by the session establishment service, a session with the mobile host for the new address of the mobile host;

resetting, by the mobility service, a communication connection for the new address of the mobile host;

retrieving buffered communication data for the communication connection between the first and second applications prior to resetting the communication connection; and sending the retrieved buffered communication data over the reset communication channel for the new address of the mobile host.

13. A method as in claim 12, comprising further the step of tunneling communication data to the mobile host using the new address of the mobile host before completing the step of resetting.

14. A method as in claim 12, wherein the session establishment protocol is the Session Initiation Protocol.

15. A computer-readable medium as in claim 12, wherein the transport protocol is the TCP.

16. A method as in claim 12, wherein the transport protocol is the UDP.

17. A method as in claim 12, wherein the first application identifies the second application by a name in the request to form a communication connection.

* * * * *